US006817756B2

(12) United States Patent
Raum et al.

(10) Patent No.: US 6,817,756 B2
(45) Date of Patent: Nov. 16, 2004

(54) METHOD OF MEASURING AMBIENT TEMPERATURE AND A TEMPERATURE MEASUREMENT ARRANGEMENT

(75) Inventors: Klaus Raum, Freising (DE); Hans Fella, Regensburg (DE)

(73) Assignee: Mahlo GmbH & Co.KG, Saal/Donau (DE)

( * ) Notice: Subject to any disclaimer, the term of this patent is extended or adjusted under 35 U.S.C. 154(b) by 0 days.

(21) Appl. No.: 10/369,722

(22) Filed: Feb. 21, 2003

(65) Prior Publication Data

US 2004/0013159 A1 Jan. 22, 2004

(30) Foreign Application Priority Data

Feb. 21, 2002 (DE) .......................................... 102 07 307
Mar. 26, 2002 (DE) .......................................... 102 13 392

(51) Int. Cl.$^7$ ................................................ G01K 1/16
(52) U.S. Cl. ...................................................... 374/120
(58) Field of Search ................................ 374/120, 121, 374/126, 43–45; 356/43; 136/213–215; 33/501.02, 501.03

(56) References Cited

U.S. PATENT DOCUMENTS

| | | | | |
|---|---|---|---|---|
| 4,559,819 A | * | 12/1985 | Deppe et al. ................. | 73/159 |
| 5,326,173 A | * | 7/1994 | Evans et al. ................. | 374/126 |
| 5,716,133 A | * | 2/1998 | Hosokawa et al. ........... | 374/121 |
| 5,993,059 A | * | 11/1999 | O'Neill et al. ............... | 374/126 |
| 6,123,455 A | * | 9/2000 | Beshears et al. ............. | 374/161 |
| 6,200,634 B1 | * | 3/2001 | Johnsgard et al. ........... | 374/130 |
| 6,341,891 B1 | * | 1/2002 | Hollander et al. ........... | 374/121 |
| 2002/0048307 A1 | * | 4/2002 | Schmidt ...................... | 374/121 |

FOREIGN PATENT DOCUMENTS

DE 43 40 430 6/1995

OTHER PUBLICATIONS

H. L. Haupt, Feingerätetechnik, vol. 26, No. 3/1977, pp. 125–127. "Pyrometrische Verfahren Sur Messung Der Wahren Oberflächentemperatur".
J. Lohrengel, et al., PTB–Mitteilungen, vol. 106, No. 4/96, pp. 259–265, "Wärmeleitfähigkeit, Gesamtemissionsgrade Und Spectrale Emissionsgrade Der Beschichtung Nextel–Velvet–Coating 811–21 (Ral 900 15 Tiefschwarz Matt)".

* cited by examiner

Primary Examiner—G. Bradley Bennett
(74) Attorney, Agent, or Firm—Oblon, Spivak, McClelland, Maier & Neustadt, P.C.

(57) ABSTRACT

The invention relates to a method and an arrangement for measuring the ambient temperature in barely accessible or hazardous locations, in particular in the proximity of textile, paper or similar webs or other work pieces or materials being conveyed, of which at least one property is determined by means of a methodical system, which requires at least the direct ambient temperature as a comparative or reference value. According to the invention, a pyrometric radiation meter known per se is used. A thermal radiator in thermal balance with the environment is positioned directly proximate to the material web. Detection of the heat radiation spectrum and hence an indirect determination of the ambient temperature is carried out by means of the pyrometer via said thermal radiator.

23 Claims, 1 Drawing Sheet

METHOD OF MEASURING AMBIENT TEMPERATURE AND A TEMPERATURE MEASUREMENT ARRANGEMENT

BACKGROUND OF THE INVENTION

1. Field of the Invention

The invention relates to a method of measuring ambient temperature as well as to a temperature measurement arrangement for carrying out the method.

2. Discussion of the Background

Thermocouple elements, resistance thermometers, semiconductor elements, but also fiber optic sensors are in use as electric and electronic temperature sensors, that cover a large temperature range. Such types of sensors are generally formed as primary detectors arranged in the ambient medium, which can be supplied with voltage and current via electric lines.

For measuring the basis weight of high-speed conveyed material webs such as textile, paper and similar webs, a precise determination of the temperature of the ambient air is required for reasons of measurement accuracy. Here, the possibilities for using the mentioned off-machine temperature sensors are limited. The sensors must have a sufficiently short response time, and hence as low a heat capacity as possible, and on the other hand, must be sufficiently robust, since they will be mounted directly proximate to the material web, e.g. a web that is guided through a textile finishing plant in a harsh industrial environment.

As a rule, mechanical robustness in known embodiments is linked with a more solid construction and thus with too high a heat capacity and a correspondingly long response time.

The use of electrically exposed devices is moreover excluded or separate measures of protection are necessary in potentially explosive locations or in direct proximity to a material web that gives off inflammable solvent vapors.

Pyrometric temperature sensors that use a heat radiation spectrum and consequently operate in a non-contact manner cannot be used without problems for measuring the ambient temperature of a material web, since the heat radiation characteristics of gases, principally due to the very poor conformity thereof and which exhibit the behavior of a so-called full radiator, render a precise temperature determination very difficult.

The object of the invention is therefore to provide a method of measuring ambient temperatures, in particular directly proximate to high-speed material webs subjected to measurement of the basis weight, and a device for carrying out said method, which method or device may be implemented in a simple and cost-efficient manner in an already existing manufacturing process and/or control process allowing the temperature measurement to have a short response time, and which method or device guarantees a precise temperature measurement.

SUMMARY OF THE INVENTION

According to the invention, the temperature of a planar radiator arranged directly proximate to the material web and in thermal balance with the local environment, is measured across its heat radiation spectrum by means of a pyrometric radiation meter, and thus the temperature of the ambient medium directly above the material web is indirectly determined.

Since the radiator is in thermal balance with the ambient medium, the radiator exhibits the same temperature but with a selectively improved radiation characteristic. A pyrometric temperature measurement may be effected distant from the material web, whereby it is ensured by means of the planar radiator that the temperature of the ambient medium, e.g. air, is determined, and not that of an undesired background surface.

Concerning the arrangement, the radiator is formed as a thin sheet having a low heat capacity and, in relation to its volume, a large heat contact surface with the ambient medium. Thereby, a low response time of the entire temperature measurement arrangement is achieved, since the sheet adopts the ambient temperature within a short time.

To shield result-distorting heat radiation from other undesired heat sources, in particular from the direction of the material web, the sheet is provided, at least on one side, with a coating impermeable to at least the infrared spectral range of the electromagnetic spectrum. Heat radiation from heat sources other than the ambient air, is reflected by said coating, accordingly does not penetrate the sheet material, and thus heats the sheet only to a negligible degree.

For use as the shielding coating, metallic materials in particular are possible, which can be applied to the sheet, for example by a vapor or a similar deposition process. Metallic layers are therefore advantageous because these have a reflection coefficient of over 90% in the longer wave length range of the electromagnetic spectrum.

On the side facing the pyrometric radiation meter, the thin sheet may be provided with a an emission coefficient increasing coating of the sheet surface. The coating is effected such that the radiation characteristics of the sheet approximates as closely as possible to that of an ideal full radiator.

Previously, varnishes suitable for such a coating, in particular carbon varnishes, have been used, which have shown the highest possible conformity with the radiation characteristic of a full radiator in tests.

The entire device comprised of a thin sheet and a pyrometric radiation meter is formed so that the radiation meter is arranged spatially separated from the thin sheet. Here, the spacing is essentially determined only by the dimensions of the sheet surface and the aperture angle resulting from the pyrometer objective. This allows maintenance and repair operations to be particularly simple in that a defective sheet may be replaced with another sheet.

Measurement of the ambient temperature directly proximate to the material web from a distance is likewise possible, with all electric feed lines outside of the housing containing said pyrometer being no longer necessary.

The pyrometric radiation meter may be placed within a separately arranged housing that has, at least on one side facing the sheet, a window permeable to radiation in the infrared and longer wave spectral range.

The temperature measurement arrangement of the invention allows ambient temperatures to be determined without contact in the proximity of material webs being conveyed and/or moved. This is then advantageous in particular when the environment of the web is loaded with solvent vapors or other influences excluding standard temperature measurement with electric elements. Since the pyrometric measurement means is arranged outside of the environment to be measured, and the thin sheet does not require any electric feed lines, the risk of accident or interference is avoided.

BRIEF DESCRIPTION OF THE DRAWINGS

The invention will be explained below in more detail by means of an exemplary embodiment and with reference to the Figures.

These show.

DESCRIPTION OF THE PREFERRED EMBODIMENTS

Figure 1A:
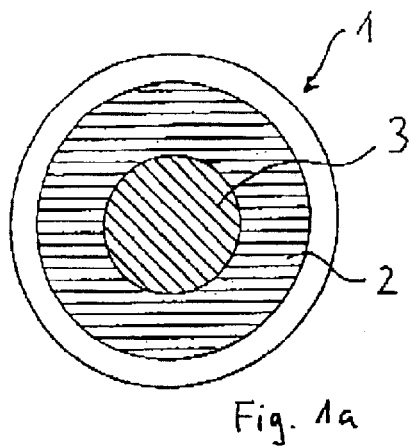
FIG. 1a a schematic drawing of a thin sheet, in particular the layer structure thereof on a side facing a pyrometric radiation meter.
Figure 1B:
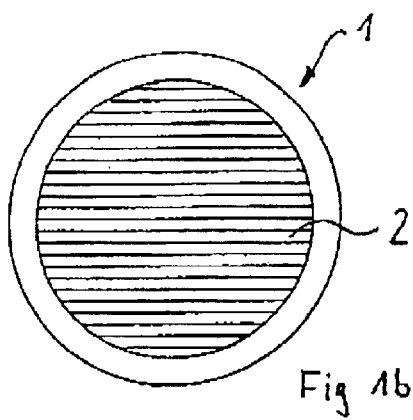
FIG. 1b a schematic drawing of a thin sheet, in particular the layer structure thereof on a side facing away from the pyrometric radiation meter.

FIGS. 1a and 1b show a schematic drawing of a thin sheet arranged next to a material web not shown, in particular with respect to the layer structure or coating thereof. The thin sheet 1 features a metal coating 2 reflecting infrared radiation. This shielding coating is accordingly vapor-deposited and formed so that the layer thickness thereof prevents heat energy that does not originate from the ambient medium from penetrating the sheet material. Here, a layer thickness of a few microns is already sufficient, provided that the shielding layer is made of a material having a high metallic conductivity, and hence a high reflection capacity in the infrared spectral range. Said layer may, for example, be formed of silver or aluminum. The metal coating 2 is advantageously formed on both sides of the thin sheet.

An emission coefficient increasing coating is essentially positioned centrally, preferably on one side of the thin sheet. It is required of this coating that the radiation characteristic of the sheet surface in the coated zone correspond as far as possible to the radiation characteristic of a full radiator with a maximum emission capacity.

Since maximum emission capacity brings maximum absorption, said coating must be of matt black. A carbon varnish coating 3 here is advantageous. This emission-promoting coating is accordingly applied onto that side of the thin sheet facing the pyrometer as can be seen from the comparison of FIGS. 1a and 1b.

Figure 2:
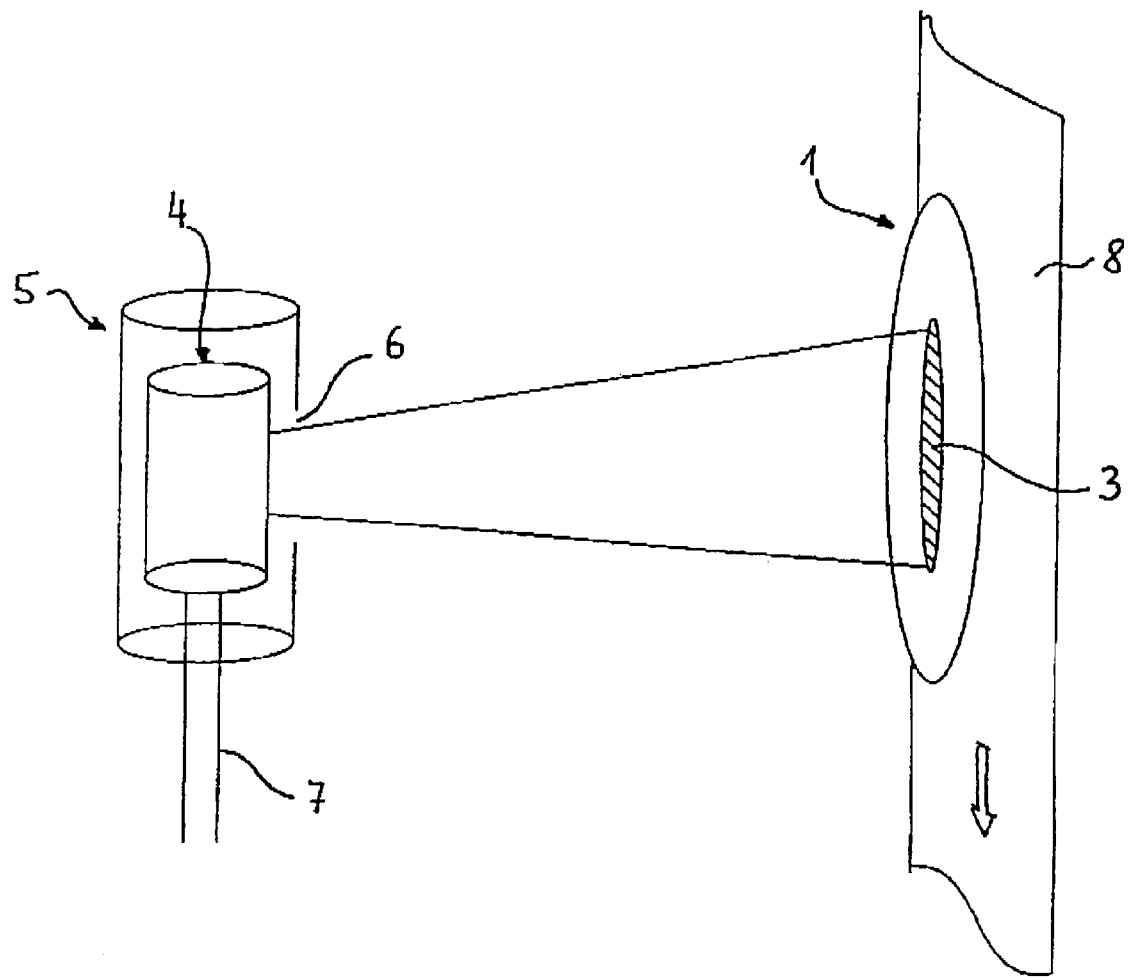
FIG. 2 an overall view of an inventive temperature measurement arrangement.

In FIG. 2, an arrangement of a pyrometric radiation meter 4 and a thin sheet 1 is illustrated. The thin sheet 1 is in thermal balance with the environment, e.g. air, and radiates via the carbon varnish coating 3 a heat radiation spectrum corresponding to the ambient temperature, which heat radiation spectrum is detected by the pyrometric radiation meter 4. The thin sheet 1 and the pyrometric radiation meter 4 are spatially separated. The spacing between the two components of the measurement arrangement is essentially determined only by the aperture angle, which in turn is instrumentally predetermined by an objective of the pyrometric radiation meter 4 and the sensitivity of the device itself. The radiation meter 4 as the actual temperature detector is thus situated outside of the direct environment of the material web 8.

In addition, the radiation meter 4 is positioned in an environmentally sealed housing 5 that in particular features an explosion-proof feed possibility for electric lines 7. In the direction of the thin sheet 1, said housing 5 features a window 6 permeable to heat radiation in the spectral range to be expected, which is adapted to the aperture angle of the pyrometric radiation meter in such a manner that the emission-optimized coating 3 of the thin sheet 1 is optimally imaged on the objective of the pyrometric radiation meter 4.

Alternatively, in place of a metal-coated sheet, a metal foil itself may be used, which features the previously mentioned emission-optimized coating 3 on one side.

It is essential in the invention that thermal contact with the housing be very low whilst the surface for the heat exchange with the environment should be very large. The influence of the temperature of the sheet support is therefore extremely low.

LIST OF REFERENCE NUMERALS 1 thin sheet
2 shielding coating
3 emission-promoting coating
4 pyrometric radiation meter
5 housing
6 window
7 electric lines
8 material web

What is claimed is:

1. A temperature measurement arrangement for measuring an ambient temperature in an ambient medium, comprising:
   a conveyed material web in direct proximity of the ambient medium;
   a pyrometric radiation meter; and
   a planar thermal radiator in balance with the ambient medium and including a shielding coating that prevents penetration of heat energy not originating from the ambient medium, and including a selectively improved radiation characteristic,
   wherein the planar thermal radiator is arranged directly proximate to the conveyed material web, with indirect temperature determination of the ambient medium being performed across a heat radiation spectrum of said planar thermal radiator, and
   wherein a methodical system determines at least one property of the conveyed material web and requires at least a value of the ambient temperature.

2. The temperature measurement arrangement according to claim 1,
   wherein said planar thermal radiator includes a sheet of a predefined heat capacity,
   wherein said planar thermal radiator includes a heat radiation surface and a heat exchange surface, and is arranged directly proximate to the conveyed material web in heat contact with the ambient environment, a surface of the sheet having a reflective coating on at least one side to shield against heat radiation of other undesired heat sources, and
   wherein said reflective coating is impermeable at least to the infrared spectral range, and the pyrometric radiation meter is arranged spatially separated from said thin sheet.

3. The temperature measurement arrangement according to claim 2,
   wherein the reflective coating comprises a metal layer.

4. The temperature measurement arrangement according to claim 3,
   wherein said sheet has at least on a side facing the pyrometric radiation meter a coating with a known temperature-independent emission coefficient.

5. The temperature measurement arrangement according to claim 4,
   wherein said coating comprises a varnish coating.

6. The temperature measurement arrangement according to claim 2,
   wherein said pyrometric radiation meter is arranged as an autonomous unit spatially separated from the sheet at a spacing essentially defined by dimensions and an aperture angle of a pyrometer objective of said pyrometric radiation meter.

7. The temperature measurement arrangement according to claim 2,
wherein said pyrometric radiation meter is positioned within a housing which exhibits on a side facing said sheet a window permeable to at least infrared radiation.

8. The temperature measurement arrangement according to claim 2,
wherein a basis weight of the conveyed material web must be continuously determined.

9. The temperature measurement arrangement according to claim 1,
wherein said conveyed material web is selected from the group consisting of high-speed textile and paper.

10. The temperature measurement arrangement according to claim 1,
wherein the ambient medium is directly above the conveyed material web.

11. The temperature measurement arrangement according to claim 4,
wherein said coating comprises a carbon varnish coating.

12. A method of measuring an ambient temperature in an ambient medium, comprising:
arranging a conveyed material web in direct proximity of the ambient medium;
thermally balancing the planar thermal radiator with the ambient medium, said thermal radiator including a shielding coating that prevents penetration of heat energy not originating from the ambient medium, and including a selectively improved radiation characteristic;
arranging a planar thermal radiator directly proximate to the conveyed material web;
using a pyrometric radiation meter to determine the ambient temperature of the ambient medium indirectly across a heat radiation spectrum of said planar thermal radiator; and
determining at least one property of the conveyed material web with a methodical system requiring at least a value of the ambient temperature.

13. The method according to claim 12,
wherein said planar thermal radiator includes a sheet of a predefined heat capacity, and
wherein said planar thermal radiator includes a heat radiation surface and a heat exchange surface, and is arranged directly proximate to the conveyed material web in heat contact with the ambient environment, a surface of the sheet having a reflective coating on at least one side to shield against heat radiation of other undesired heat sources, and
wherein said reflective coating is impermeable at least to the infrared spectral range, and the pyrometric radiation meter is arranged spatially separated from said sheet.

14. The method according to claim 13,
wherein the reflective coating comprises a metal layer.

15. The method according to claim 14,
wherein said sheet has at least on a side facing the pyrometric radiation meter a coating with a known temperature-independent emission coefficient.

16. The method according to claim 15,
wherein said coating comprises a varnish coating.

17. The method according to claim 13, further comprising:
arranging said pyrometric radiation meter as an autonomous unit spatially separated from the sheet at a spacing essentially defined by dimensions and an aperture angle of a pyrometer objective of said pyrometric radiation meter.

18. The method according to claim 13, further comprising:
positioning said pyrometric radiation meter within a housing which exhibits on a side facing said thin sheet a window permeable to at least infrared radiation.

19. The method according to claim 13, further comprising:
continuously determining a basis weight of the conveyed material web.

20. The method according to claim 12, further comprising:
selecting said conveyed material web from the group consisting of high-speed textile and paper.

21. The method according to claim 12, further comprising:
arranging the ambient medium directly above the conveyed material web.

22. The method according to claim 15,
wherein said coating comprises a carbon varnish coating.

23. A temperature measurement arrangement for measuring an ambient temperature in an ambient medium, comprising:
means for arranging a conveyed material web in direct proximity of the ambient medium;
means for thermally balancing the planar thermal radiator with the ambient medium, said thermal radiator including a shielding coating that prevents penetration of heat energy not originating from the ambient medium, and including a selectively improved radiation characteristic;
means for arranging a planar thermal radiator directly proximate to the conveyed material web;
means for determining the ambient temperature of the ambient medium indirectly across a heat radiation spectrum of said planar thermal radiator; and
means for determining at least one property of the conveyed material web with a methodical system requiring at least a value of the ambient temperature.

* * * * *